(12) United States Patent
Kim et al.

(10) Patent No.: US 12,334,263 B2
(45) Date of Patent: Jun. 17, 2025

(54) MULTILAYER CAPACITOR

(71) Applicant: SAMSUNG ELECTRO-MECHANICS CO., LTD., Suwon-si (KR)

(72) Inventors: Jin Woo Kim, Suwon-si (KR); Jong Suk Jeong, Suwon-si (KR); Chun Hee Seo, Suwon-si (KR); Jeong Wook Seo, Suwon-si (KR); Dong Geon Yoo, Suwon-si (KR); Tae Hyung Kim, Suwon-si (KR); Byung Kun Kim, Suwon-si (KR); Ki Yong Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 450 days.

(21) Appl. No.: 17/543,113

(22) Filed: Dec. 6, 2021

(65) Prior Publication Data

US 2022/0230807 A1    Jul. 21, 2022

(30) Foreign Application Priority Data

Jan. 15, 2021  (KR) .................. 10-2021-0006205
May 18, 2021  (KR) .................. 10-2021-0064091

(51) Int. Cl.
*H01G 4/12* (2006.01)
*C04B 35/468* (2006.01)
(Continued)

(52) U.S. Cl.
CPC ....... *H01G 4/1227* (2013.01); *C04B 35/4682* (2013.01); *H01G 4/008* (2013.01);
(Continued)

(58) Field of Classification Search
CPC ........ C04B 35/4682; C04B 2235/3236; C04B 2235/40; C04B 2235/75; H01G 4/008;
(Continued)

(56) References Cited

U.S. PATENT DOCUMENTS 9,099,244 B2    8/2015  Suzuki et al.
2013/0321980 A1* 12/2013  Suzuki ................ H01G 4/30
                                                29/25.42
(Continued)

FOREIGN PATENT DOCUMENTS

KR   10-2013-011537 A   10/2013
KR   10-1581925 B1      12/2015
(Continued)

OTHER PUBLICATIONS

Korean Office Action dated May 8, 2025 issued in Korean Patent Application No. 10-2021-0064091 (with English translation).

*Primary Examiner* — Nathan Milakovich
(74) *Attorney, Agent, or Firm* — Morgan, Lewis & Bockius LLP

(57) ABSTRACT

A multilayer capacitor includes a body including a plurality of dielectric layers and a plurality of internal electrodes laminated with the dielectric layers interposed therebetween, and an external electrode disposed externally on the body and connected to one or more of the plurality of internal electrodes. One of the plurality of dielectric layers includes a barium titanate composition including a Sn component. One of the plurality of internal electrodes includes a Sn component. The one of the plurality of dielectric layers has a Sn content equal to at least twice a Sn content of the one of the plurality of internal electrodes adjacent to the one of the plurality of dielectric layers.

23 Claims, 4 Drawing Sheets

(51) Int. Cl.
  *H01G 4/008* (2006.01)
  *H01G 4/232* (2006.01)
  *H01G 4/248* (2006.01)
  *H01G 4/30* (2006.01)

(52) U.S. Cl.
  CPC ............ *H01G 4/232* (2013.01); *H01G 4/248* (2013.01); *H01G 4/30* (2013.01); *C04B 2235/3236* (2013.01); *C04B 2235/40* (2013.01); *C04B 2235/75* (2013.01)

(58) Field of Classification Search
  CPC ...... H01G 4/1227; H01G 4/232; H01G 4/248; H01G 4/30
  See application file for complete search history.

(56) References Cited

U.S. PATENT DOCUMENTS

| | | | |
|---|---|---|---|
| 2015/0155098 A1* | 6/2015 | Yamaguchi | H01G 13/00 156/89.16 |
| 2016/0358713 A1* | 12/2016 | Doi | H01G 4/0085 |
| 2017/0178812 A1 | 6/2017 | Shimada | |
| 2019/0304695 A1* | 10/2019 | Kim | H01G 4/30 |
| 2020/0058444 A1 | 2/2020 | Cha et al. | |
| 2022/0139630 A1* | 5/2022 | Yamada | H01G 4/008 361/321.2 |

FOREIGN PATENT DOCUMENTS

| KR | 10-2017-0072799 A | 6/2017 |
|---|---|---|
| KR | 10-2019-0121149 A | 10/2019 |

* cited by examiner

MULTILAYER CAPACITOR

CROSS-REFERENCE TO RELATED APPLICATION(S)

This application claims benefit of priority to Korean Patent Application No. 10-2021-0006205 filed on Jan. 15, 2021 and Korean Patent Application No. 10-2021-0064091 filed on May 18, 2021 in the Korean Intellectual Property Office, the disclosures of which are incorporated herein by reference in their entirety.

TECHNICAL FIELD

Example embodiments of the present disclosure relate to a multilayer capacitor.

BACKGROUND

A capacitor is a device for storing electricity, and when two electrodes are disposed to oppose each other, and a voltage is applied thereto, electricity may be accumulated in each electrode. When a DC voltage is applied, a current may flow in the capacitor as electricity is stored, but when the accumulation is completed, the current may stop flowing. When an AC voltage is applied, an AC current may flow while a polarity of the electrode changes.

Such a capacitor may include, depending on a type of insulator provided between electrodes, an aluminum electrolytic capacitor having an electrode formed of aluminum and having a thin oxide film between the aluminum electrodes, a tantalum capacitor using tantalum as an electrode material, a ceramic capacitor using a dielectric having a high dielectric constant such as barium oxide, a multilayer ceramic capacitor (MLCC) using a ceramic having a high dielectric constant as a dielectric provided between electrodes, and a film capacitor using a polystyrene film as a dielectric between electrodes.

Among the capacitors, a multilayer ceramic capacitor may have excellent temperature and frequency properties, and may be implemented in a small size such that a multilayer ceramic capacitor has been widely applied in various fields such as a high-frequency circuit. Recently, there have been attempts to implement a multilayer ceramic capacitor to have a smaller size, and to this end, a dielectric layer and an internal electrode may be configured to have a reduced thickness. When the dielectric layer has a reduced thickness, however, high-temperature reliability and withstand voltage properties may deteriorate, and there have been attempts to address such issues.

SUMMARY

An example embodiment of the present disclosure is to provide a multilayer capacitor which may have improved high-temperature reliability and withstand voltage properties.

According to an example embodiment of the present disclosure, a multilayer capacitor includes a body including a plurality of dielectric layers and a plurality of internal electrodes laminated with the dielectric layers interposed therebetween, and an external electrode disposed externally on the body and connected to one or more of the internal electrodes. One of the plurality of dielectric layers include a barium titanate composition including a Sn component. One of the plurality of internal electrodes includes a Sn component. The one of the plurality of dielectric layers has a Sn content equal to at least twice a Sn content of the one of the plurality of internal electrodes adjacent to the one of the plurality of dielectric layers.

The one of the plurality of dielectric layers may include a first Sn-rich region disposed on an interfacial surface with the one of the plurality of internal electrodes, and the one of the plurality of internal electrodes may include a second Sn-rich region disposed on the interfacial surface with the one of the plurality of dielectric layers.

A sum of thicknesses of the first and second Sn-rich regions may be 5 nm or less.

A thickness of the first Sn rich region may be greater than a thickness of the second Sn rich region.

A thickness of the second Sn rich region may be greater than a thickness of the first Sn rich region.

A sum of contents of Sn included in the first and second Sn-rich regions may be 0.8 mol or more based on 100 mol of a Ti content of the one of the plurality of dielectric layers.

A content of Sn included in the first Sn-rich region may be greater than a content of Sn included in a region of the one of the plurality of dielectric layers other than the first Sn-rich region.

A content of Sn included in the second Sn-rich region may be greater than a content of Sn included in a region of the one of the plurality of internal electrodes other than the second Sn-rich region.

In the first Sn-rich region, a content of Sn may decrease from the interfacial surface toward a center of the one of the plurality of dielectric layers.

In the second Sn-rich region, a content of Sn may decrease from the interfacial surface toward a center of the one of the plurality of internal electrodes.

In the interfacial surface, the first and second Sn-rich regions may have the same Sn content.

An average thickness of the one of the plurality of dielectric layers may be 500 nm or less.

An average thickness of the one of the plurality of internal electrodes may be 400 nm or less.

According to an example embodiment of the present disclosure, a multilayer capacitor includes a body including a plurality of dielectric layers and a plurality of internal electrodes laminated with the dielectric layers interposed therebetween, and an external electrode disposed externally on the body and connected to one or more of the plurality of internal electrodes. One of the plurality of dielectric layers includes a barium titanate composition including Sn. One of the plurality of the internal electrodes includes Sn. The one of the plurality of dielectric layers includes a first Sn-rich region disposed on an interfacial surface with the internal electrode. One of the plurality of internal electrodes includes a second Sn-rich region disposed on the interfacial surface with the one of the plurality of dielectric layers. A sum of thicknesses of the first and second Sn-rich regions is 5 nm or less.

According to an example embodiment of the present disclosure, a multilayer capacitor includes a body including a plurality of dielectric layers and a plurality of internal electrodes laminated with the dielectric layers interposed therebetween; and an external electrode disposed externally on the body and connected to one or more of the plurality of internal electrodes. One of the plurality of dielectric layers includes a first Sn-rich region disposed on an interfacial surface with one of the plurality of internal electrodes. The one of the plurality of internal electrodes includes a second Sn-rich region disposed on the interfacial surface with the one of the plurality of dielectric layers. A sum of contents of Sn included in the first and second Sn-rich regions is 0.8 mol or more based on 100 mol of a Ti content of the one of the plurality of dielectric layers.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
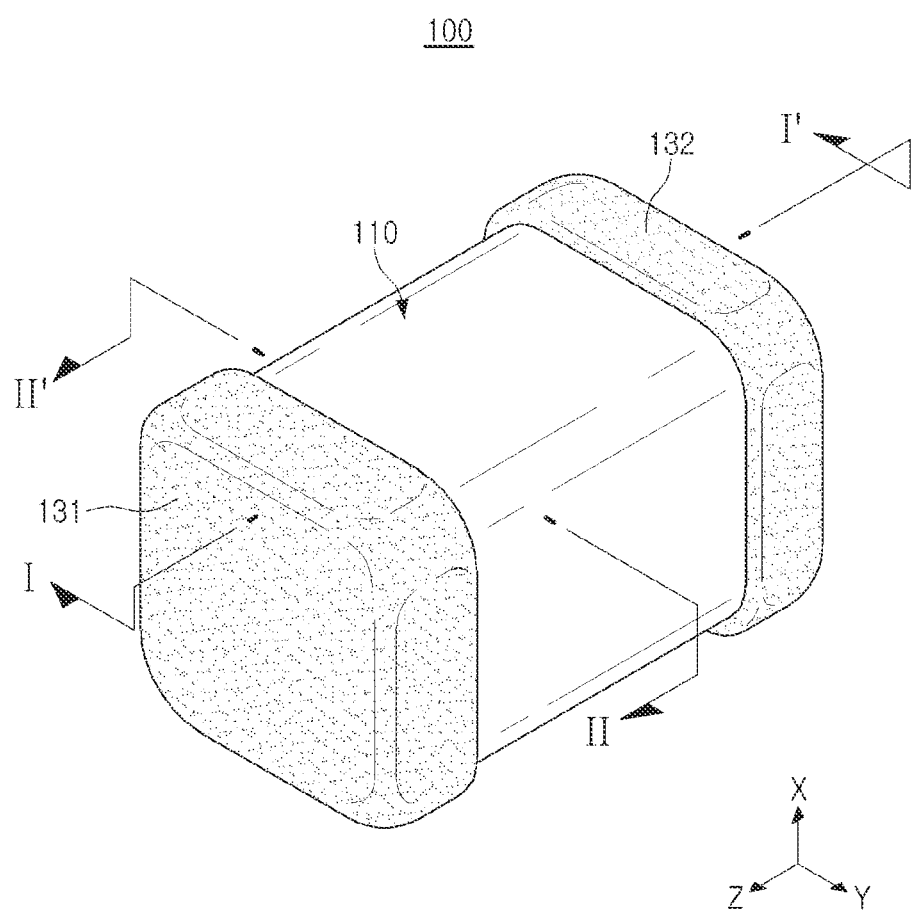
FIG. 1 is a perspective diagram illustrating an exterior of a multilayer capacitor according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description. Also, elements having the same function within the scope of the same concept represented in the drawing of each example embodiment will be described using the same reference numeral.

In the drawings, same elements will be indicated by the same reference numerals. Also, redundant descriptions and detailed descriptions of known functions and elements that may unnecessarily make the gist of the present invention obscure will be omitted. In the accompanying drawings, some elements may be exaggerated, omitted or briefly illustrated, and the sizes of the elements do not necessarily reflect the actual sizes of these elements. Also, it will be understood that when a portion "includes" an element, it may further include another element, not excluding another element, unless otherwise indicated.

Figure 2:
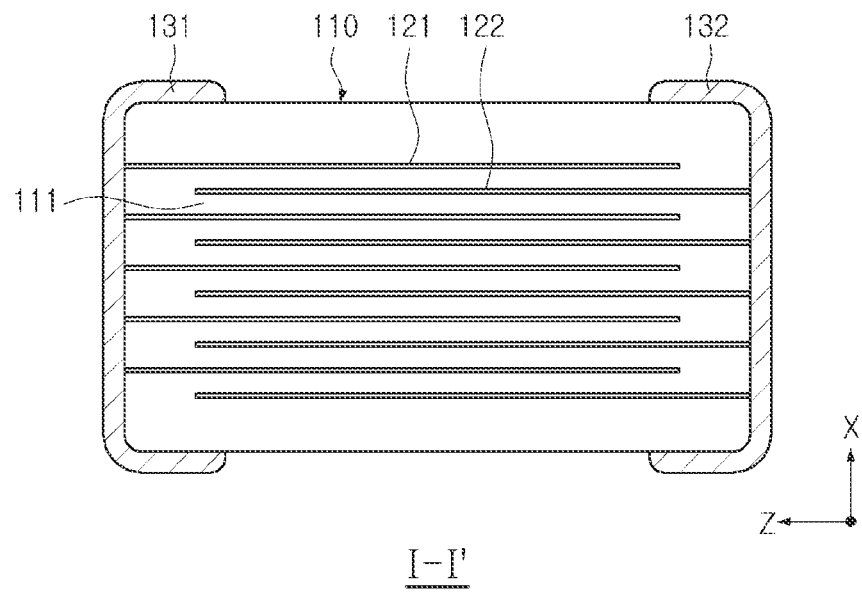
FIG. 2 is a cross-sectional diagram illustrating the multilayer capacitor taken along line I-I' in FIG. 1.
Figure 3:
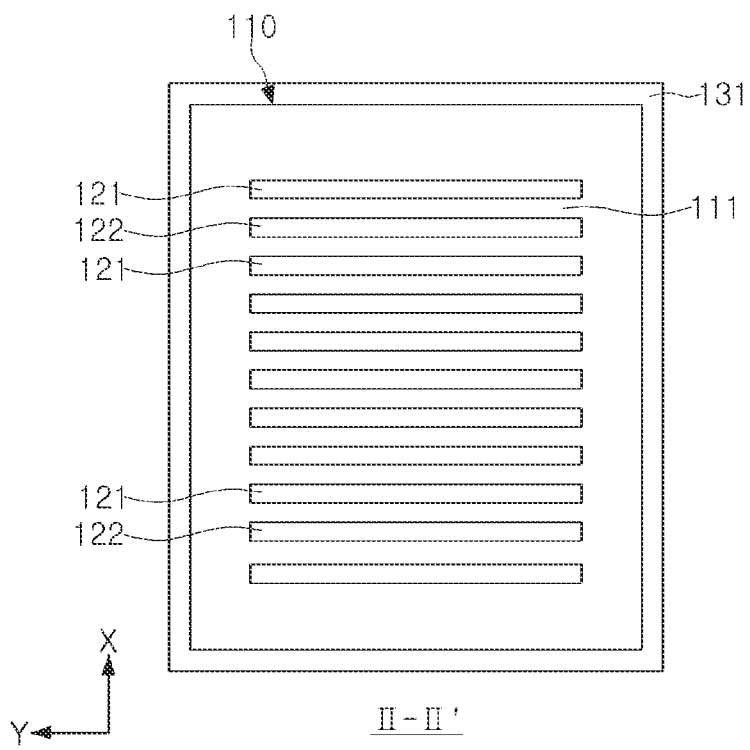
FIG. 3 is a cross-sectional diagram illustrating the multilayer capacitor taken along line II-II' in FIG. 1.
Figure 4:
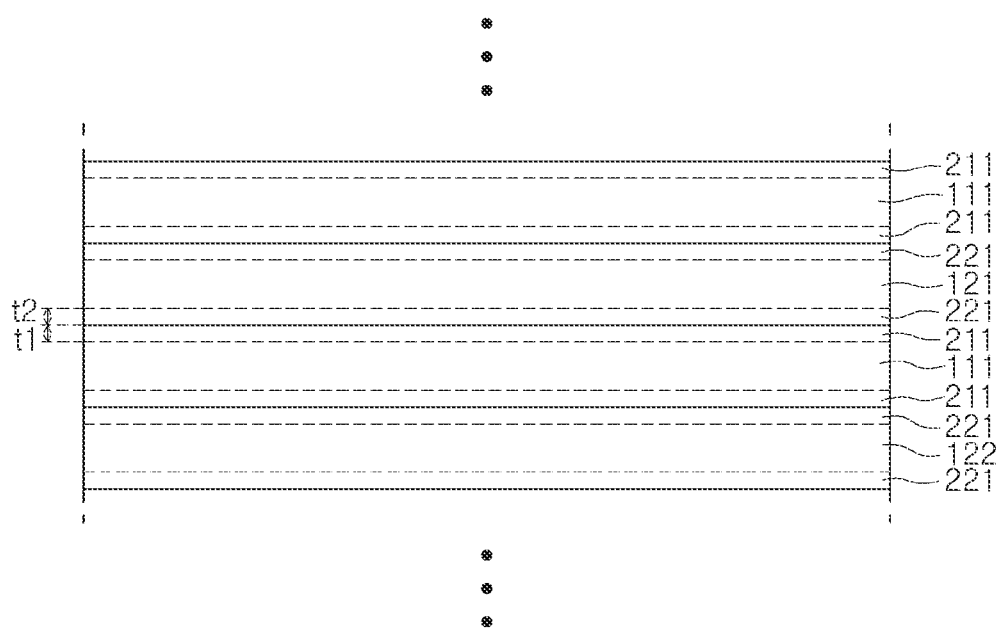
FIG. 4 is an enlarged diagram illustrating a portion of a dielectric layer and a portion of an internal electrode.
Figure 5:
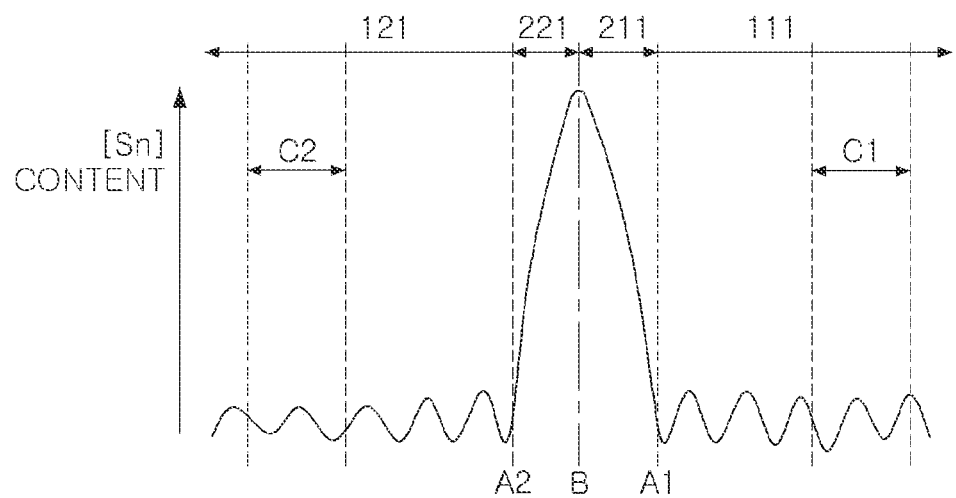
FIGS. 5 and 6 are graphs illustrating a content of Sn in a dielectric layer and an internal electrode.
Figure 6:
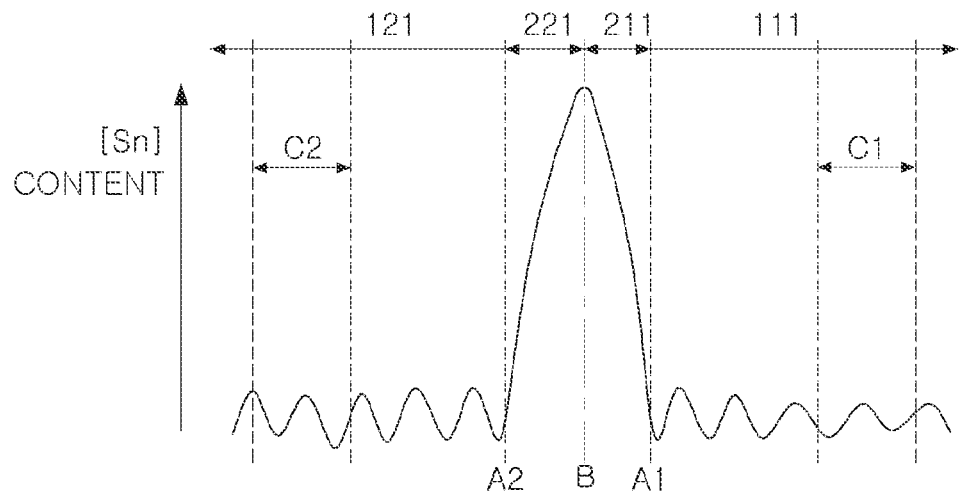

FIG. 1 is a perspective diagram illustrating an exterior of a multilayer capacitor according to an example embodiment of the present disclosure. FIG. 2 is a cross-sectional diagram illustrating the multilayer capacitor taken along line I-I' in FIG. 1. FIG. 3 is a cross-sectional diagram illustrating the multilayer capacitor taken along line II-II' in FIG. 1. FIG. 4 is an enlarged diagram illustrating a portion of a dielectric layer and a portion of an internal electrode. FIGS. 5 and 6 are graphs illustrating a content of Sn in a dielectric layer and an internal electrode.

Referring to FIGS. 1 to 3, a multilayer capacitor 100 according to an example embodiment may include a body 110 including a dielectric layer 111 and a plurality of internal electrodes 121 and 122 laminated with the dielectric layer 111 interposed therebetween and external electrodes 131 and 132. The plurality of dielectric layers 111 may include a barium titanate composition including a Sn component, and the internal electrodes 121 and 122 may include a Sn component. Also, at least one of the plurality of dielectric layers 111 may have a Sn content equal to at least twice a Sn content of an adjacent internal electrode among the internal electrodes 121 and 122.

The body 110 may include a lamination structure in which a plurality of dielectric layers 111 are laminated in a first direction (X direction), and may be obtained by, for example, laminating a plurality of green sheets and sintering the plurality of green sheets. Two directions perpendicular to the first direction (X direction) and perpendicular to each other may be defined as a second direction (Y direction) and a third direction (Z direction), respectively. As illustrated in FIG. 1, the body 110 may have a shape similar to a rectangular parallelepiped. The dielectric layer 111 included in the body 110 may include a ceramic material having a high dielectric constant, and may include a barium titanate ($BaTiO_3$) composition. Specifically, the dielectric layer 111 may include a base material main component including Ba and Ti, where the base material main component may include a main component represented as (Ba, Ca) (Ti,Ca) $O_3$, (Ba, Ca) (Ti,Zr)$O_3$, Ba (Ti, Zr) $O_3$ in which $BaTiO_3$ or Ca, Zr, and the like, is partially solid solute. Also, the dielectric layer 111 may further include additives, organic solvents, plasticizers, binders and dispersants if necessary, in addition to the ceramic material, a main component. Further, the above-described barium titanate composition of the plurality of dielectric layers 111 may include a Sn component, and may be added in the form of Sn oxide when the dielectric layer 111 is manufactured. The Sn component present in the dielectric layer 111 may strengthen a Schottky barrier at a grain boundary after baking, and may also control grain growth of dielectric grains. Accordingly, even when the dielectric layer 111 is formed to have a thin thickness, high-temperature reliability and withstand voltage properties may improve.

The plurality of internal electrodes 121 and 122 may form capacitance and may be obtained by, for example, printing a paste including a conductive metal by a predetermined thickness on one surface of a ceramic green sheet and sintering the paste. In this case, as illustrated in FIG. 2, the plurality of internal electrodes 121 and 122 may include first and second internal electrodes 121 and 121 exposed in the third direction (Z direction) of the body 110 to oppose each other. The first and second internal electrodes 121 and 122 may be connected to different external electrodes 131 and 132 and may have different polarities when driven, and may be electrically separated from each other by the dielectric layer 111 disposed therebetween. However, the number of the external electrodes 131 and 132 or the connection method with the internal electrodes 121 and 122 may be varied in example embodiments.

The main component material for forming the internal electrodes 121 and 122 may include nickel (Ni), copper (Cu), palladium (Pd), silver (Ag), or the like, and alloys thereof may also be used. As described above, the internal electrodes 121 and 122 may include a Sn component. The Sn component present in the internal electrodes 121 and 122 may form an alloy with other metals or may be present as a single body (e.g., a Sn layer), and may be diffused and segregated on an interfacial surface between the internal electrodes 121 and 122 and the dielectric layer 111 such that a second Sn-rich region 221 may be formed. Since the Sn-rich region 221 has a large electrical resistance as compared to the main component (e.g., Ni) of the internal electrodes 121 and 122, when a DC voltage is applied, a voltage decrease may more greatly occur than in the example in which the second Sn-rich region 221 is not provided. Due to this action, an electric field in the dielectric layer 111 may be weakened, and accordingly, DC bias capacitance properties and reliability of the multilayer capacitor 100 may improve.

The external electrodes 131 and 132 may be formed externally on the body 110, and may include the first and second external electrodes 131 and 132 connected to the first and second internal electrodes 121 and 122, respectively. The external electrodes 131 and 132 may be formed by preparing a paste of a material including a conductive metal and applying the paste to the body 110. Examples of the conductive metal may include nickel (Ni), copper (Cu), palladium (Pd), gold (Au), or alloys thereof. The external electrodes 131 and 132 may further include a plating layer including Ni, Sn, or the like.

In the example embodiment, the internal electrodes 121 and 122 may have a Sn content smaller than that of the adjacent dielectric layer 111, and specifically, at least one of the plurality of dielectric layers 111 may have a Sn content at least twice a Sn content of the adjacent internal electrodes 121 and 122. Such a configuration may be obtained when a Sn component is added to the dielectric layer 111 during a manufacturing process and the added Sn component is diffused into the internal electrodes 121 and 122, for example. In this case, most of the Sn components present in the internal electrodes 121 and 122 may be derived from the dielectric layer 111, which will be described in greater detail with reference to FIGS. 4 to 6.

As illustrated in FIG. 4, the dielectric layer 111 may include a first Sn-rich region 211 formed on an interfacial surface with the internal electrodes 121 and 122. Also, the internal electrodes 121 and 122 may include a second Sn-rich region 221 formed on an interfacial surface with the dielectric layer 111. The first and second Sn-rich regions 211 and 221 may correspond to regions in which the Sn component added to the dielectric layer 111 diffuses and locally has a high Sn content, and a sum of thicknesses t1 and t2 thereof may be 5 nm or less. In this case, a thickness of the first Sn-rich region 211 may be greater than that of the second Sn-rich region 221 (t1>t2). According to the research of the present inventors, when the Sn component is diffused from the internal electrodes 121 and 122 into the dielectric layer 111, the dielectric layer 111 does not include Sn in a sufficient content, and the Sn-rich region present in the dielectric layer 111 may be present in less than 20% of the entire Sn-rich region in terms of a thickness ratio. In the example embodiment, the Sn content of the dielectric layer 111 may be at least twice a Sn content of the internal electrodes 121 and 122, such that the Sn component may be sufficiently secured. However, according to example embodiments, the Sn content of the dielectric layer 111 may not be necessarily at least twice the Sn content of the internal electrodes 121 and 122. In this case, a sum of the thicknesses t1 and t2 of the first and second Sn-rich regions 211 and 221 may be adjusted to be 5 nm or less, and under this thickness condition, high-temperature reliability and withstand voltage properties may be secured without greatly degrading the electrical properties of the dielectric layer 111 and the internal electrodes 121 and 122.

The above-described thickness conditions of the first and second Sn-rich regions 211 and 221 may be obtained by, for example, allowing the Sn component to be derived from the dielectric layer 111 while controlling the baking conditions. For example, when a reducing atmosphere during baking is strong, that is, when an oxygen partial pressure is lowered, the Sn oxide may be reduced and the amount of the Sn component diffused from the dielectric layer 111 to the internal electrodes 121 and 122 may increase, and the thickness of the second Sn-rich region of 221 may increase. Thus, the overall thickness of the first and second Sn-rich regions 211 and 221 and the ratio of each thickness may be adjusted as above.

A sum of the contents of Sn included in the first and second Sn-rich regions 211 and 221 may be 0.8 mol or more based on 100 mol of the Ti content of the dielectric layer 111. In this case, the Sn component may be present in the dielectric layer 111 and the internal electrodes 121 and 122 in a sufficient amount such that high-temperature reliability and withstand voltage properties may improve. Also, the content of Sn included in the first Sn-rich region 211 may be greater than the content of Sn included in a region of the dielectric layer 111 other than the first Sn-rich region 211, which may indicate that a large amount of Sn may be present in the first Sn-rich region 211. Also, the content of Sn included in the second Sn-rich region 221 may be greater than the content of Sn included in a region of the internal electrodes 121 and 122 other than the second Sn-rich region 221, and as the Sn content is sufficiently secured in the Sn-rich region 221, withstand voltage characteristics may improve.

An example of a method of measuring the content of each element in the dielectric layer 111 and the internal electrodes 121 and 122 will be described. In a region including the dielectric layer 111 and the internal electrodes 121 and 122 of one cross-sectional surface of the sintered body 110, a thinned analysis sample may be prepared using a focused ion beam (FIB) device. A damaged layer on the surface of the thinned sample may be removed using Ar ion milling, and mapping and quantitative analysis of each component may be performed on the image obtained using STEM-EDX. In this case, the quantitative analysis graph of each component may be obtained as a mass fraction of each element, which may also be represented by a mole fraction. FIGS. 5 and 6 illustrate the Sn content in the dielectric layer 111 and the internal electrode 121 in the form of a line profile. Although the Sn content of the first internal electrode 121 and the dielectric layer 111 is illustrated in FIGS. 5 and 6, a line profile similar to the above example may be obtained on the interfacial surface between the second internal electrode 122 and the dielectric layer 111.

Referring to FIG. 5, on the interfacial surface B between the dielectric layer 111 and the internal electrode 121, the Sn content of the first Sn-rich region 211 may decrease toward a center of the dielectric layer 111. Similarly, the content of Sn of the second Sn-rich region 221 may decrease toward a center of the internal electrode 121 on the interfacial surface. Also, on the interfacial surface B between the dielectric layer 111 and the internal electrode 121, the first and second Sn-rich regions 211 and 221 may have the same Sn content.

The ranges of the first and second Sn-rich regions 211 and 221 may be determined in consideration of the Sn content of central regions of the dielectric layer 111 and the internal electrodes 121 and 122, respectively. For example, the first Sn-rich region 211 may be defined up to a region A1 in which a value of the Sn content may be firstly exhibited the same as that of the Sn content of the central region of the dielectric layer 111 from the interfacial surface B. In this case, considering that the Sn content in a region other than the first Sn-rich region 211 is relatively low while the degree of change caused by noise is large, the Sn content in the central region of the dielectric layer 111 may be calculated as an average value in a section C1 at ¼ to ½ of a thickness of the dielectric layer 111 in a thickness direction from the interfacial surface B. Similarly, the second Sn-rich region 221 may be defined from the interfacial surface B to a region A2 in which a value of the Sn content may be firstly exhibited the same as that of the Sn content in the central region of the internal electrode 121 from the interfacial surface B. In this case, considering that the Sn content in a region other than the second Sn-rich region 221 is relatively low while the degree of change caused by noise is large, the Sn content in the central region of the internal electrode 121 may be calculated as an average value in a section C2 at ¼ to ½ of a thickness of the internal electrode 121 in a thickness direction from the interfacial surface B. In addition to these methods, the first and second Sn-rich regions 211 and 221 may be defined by a more simplified method, and may be, for example, from the interfacial surface B up to a region in which the Sn content decreases and starts to increase.

In the graph in FIG. 5, the first Sn-rich region 211 may have a thickness greater than that of the second Sn-rich region 221, but an example embodiment thereof is not limited thereto. In example embodiments, as illustrated in the graph in FIG. 6, the second Sn-rich region 221 may have a thickness greater than that of the first Sn-rich region 211 in the graph, and by increasing the thickness of the second Sn-rich region 221, electrical insulation on the interfacial surface between the internal electrode 121 and the dielectric layer 111 may increase. The Sn content distribution in FIG. 6 may be obtained by lowering the oxygen partial pressure during baking and allowing the Sn component to more greatly diffuse into the internal electrode 121.

The effect of the improved withstand voltage properties obtained as above may be more prominent when the dielectric layer 111 and the internal electrodes 121 and 122 have a reduced thickness. The thickness of the dielectric layer 111 may be 500 nm or less, and the thickness of the internal electrodes 121 and 122 may be 400 nm or less. The thickness of the dielectric layer 111 may refer to an average thickness of the dielectric layer 111 disposed between the internal electrodes 121 and 122. As an example of the measurement standard, the average thickness of the dielectric layer 111 may be measured by obtaining an image by scanning a cross-sectional surface of the body 110 in the first direction (X direction) and the third direction (Z direction). For example, in an arbitrary dielectric layer extracted from an image obtained by scanning a cross-sectional surface of a central portion of the body 110 in the second direction (Y direction), taken along the first and third directions, using a scanning electron microscope (SEM), thicknesses of 30 points equally spaced in the third direction may be measured and an average value thereof may be measured. The thicknesses measured at the 30 points equally spaced may be measured in a capacitor forming portion, which may refer to a region in which the internal electrodes 121 and 122 overlap each other.

Similarly, the thickness of the internal electrodes 121 and 122 may refer to an average thickness. In this case, the average thickness of the internal electrodes 121 and 122 may be measured by obtaining an image by scanning a cross-sectional surface of the body 110 in the first direction (X direction) and the third direction (Z direction). For example, in the arbitrary internal electrodes 121 and 122 extracted from an image obtained by scanning a cross-sectional surface of a central portion of the body 110 in the second direction (Y direction), taken along the first and third directions, using a scanning electron microscope (SEM), thicknesses of 30 points equally spaced in the third direction may be measured and an average value thereof may be measured. The thicknesses measured at the 30 points equally spaced may be measured in a capacitor forming portion, which may refer to a region in which the internal electrodes 121 and 122 overlap each other.

According to the aforementioned example embodiments, the multilayer capacitor may have improved high-temperature reliability and withstand voltage properties.

While the example embodiments have been illustrated and described above, it will be apparent to those skilled in the art that modifications and variations could be made without departing from the scope of the present disclosure as defined by the appended claims.

What is claimed is:

1. A multilayer capacitor, comprising:
   a body including a plurality of dielectric layers and a plurality of internal electrodes laminated with the dielectric layers interposed therebetween; and
   an external electrode disposed externally on the body and connected to one or more of the plurality of internal electrodes,
   wherein one of the plurality of dielectric layers includes a barium titanate composition including a Sn component,
   wherein one of the plurality of internal electrodes includes a Sn component, and
   wherein the one of the plurality of dielectric layers has a Sn content equal to at least twice a Sn content of the one of the plurality of internal electrodes adjacent to the one of the plurality of dielectric layers.

2. The multilayer capacitor of claim 1,
   wherein the one of the plurality of dielectric layers includes a first Sn-rich region disposed on an interfacial surface with the one of the plurality of internal electrodes, and
   wherein the one of the plurality of internal electrodes includes a second Sn-rich region disposed on the interfacial surface with the one of the plurality of dielectric layers.

3. The multilayer capacitor of claim 2, wherein a sum of thicknesses of the first and second Sn-rich regions is 5 nm or less.

4. The multilayer capacitor of claim 2, wherein a thickness of the first Sn rich region is greater than a thickness of the second Sn rich region.

5. The multilayer capacitor of claim 2, wherein a thickness of the second Sn rich region is greater than a thickness of the first Sn rich region.

6. The multilayer capacitor of claim 2, wherein a sum of contents of Sn included in the first and second Sn-rich regions is 0.8 mol or more based on 100 mol of a Ti content of the one of the plurality of dielectric layers.

7. The multilayer capacitor of claim 2, wherein a content of Sn included in the first Sn-rich region is greater than a content of Sn included in a region of the one of the plurality of dielectric layers other than the first Sn-rich region.

8. The multilayer capacitor of claim 2, wherein a content of Sn included in the second Sn-rich region is greater than a content of Sn included in a region of the one of the plurality of internal electrodes other than the second Sn-rich region.

9. The multilayer capacitor of claim 2, wherein, in the first Sn-rich region, a content of Sn decreases from the interfacial surface toward a center of the one of the plurality of dielectric layers.

10. The multilayer capacitor of claim 2, wherein, in the second Sn-rich region, a content of Sn decreases from the interfacial surface toward a center of the one of the plurality of internal electrodes.

11. The multilayer capacitor of claim 2, wherein, in the interfacial surface, the first and second Sn-rich regions have the same Sn content.

12. The multilayer capacitor of claim 1, wherein an average thickness of the one of the plurality of dielectric layers is 500 nm or less.

13. The multilayer capacitor of claim 1, wherein an average thickness of the one of the plurality of internal electrodes is 400 nm or less.

14. A multilayer capacitor, comprising:
a body including a plurality of dielectric layers and a plurality of internal electrodes laminated with the dielectric layers interposed therebetween; and
an external electrode disposed externally on the body and connected to one or more of the plurality of internal electrodes;
wherein one of the plurality of dielectric layers includes a barium titanate composition including Sn,
wherein one of the plurality of internal electrodes includes Sn,
wherein the one of the plurality of dielectric layers includes a first Sn-rich region disposed on an interfacial surface with the one of the plurality of the internal electrodes,
wherein the one of the plurality of internal electrodes includes a second Sn-rich region disposed on the interfacial surface with the one of the plurality of dielectric layers, and
wherein a sum of thicknesses of the first and second Sn-rich regions is 5 nm or less.

15. The multilayer capacitor of claim 14, wherein the thickness of the first Sn rich region is greater than the thickness of the second Sn rich region.

16. The multilayer capacitor of claim 14, wherein the thickness of the second Sn rich region is greater than the thickness of the first Sn rich region.

17. A multilayer capacitor, comprising:
a body including a plurality of dielectric layers and a plurality of internal electrodes laminated with the dielectric layers interposed therebetween; and
an external electrode disposed externally on the body and connected to one or more of the plurality of internal electrodes,
wherein one of the plurality of dielectric layers includes a first Sn-rich region disposed on an interfacial surface with one of the plurality of internal electrodes,
wherein the one of the plurality of internal electrodes includes a second Sn-rich region disposed on the interfacial surface with the one of the plurality of dielectric layers, and
wherein a sum of contents of Sn included in the first and second Sn-rich regions is 0.8 mol or more based on 100 mol of a Ti content of the one of the plurality of dielectric layers.

18. The multilayer capacitor of claim 17, wherein a sum of thicknesses of the first and second Sn-rich regions is 5 nm or less.

19. The multilayer capacitor of claim 17, wherein a thickness of the first Sn rich region is greater than a thickness of the second Sn rich region.

20. The multilayer capacitor of claim 17, wherein a thickness of the second Sn rich region is greater than a thickness of the first Sn rich region.

21. The multilayer capacitor of claim 17, wherein a content of Sn included in the first Sn-rich region is greater than a content of Sn included in a region of the one of the plurality of dielectric layers other than the first Sn-rich region.

22. The multilayer capacitor of claim 17, wherein a content of Sn included in the second Sn-rich region is greater than a content of Sn included in a region of the one of the plurality of internal electrodes other than the second Sn-rich region.

23. The multilayer capacitor of claim 17, wherein, in the first Sn-rich region, a content of Sn decreases from the interfacial surface toward a center of the one of the plurality of dielectric layers, and
wherein, in the second Sn-rich region, a content of Sn decreases from the interfacial surface toward a center of the one of the plurality of internal electrodes.

* * * * *